US009933272B2

(12) United States Patent
Woolley

(10) Patent No.: US 9,933,272 B2
(45) Date of Patent: Apr. 3, 2018

(54) NAVIGATION LANE GUIDANCE

(71) Applicant: Uber Technologies, Inc., San Francisco, CA (US)

(72) Inventor: Seth Alan Woolley, Portland, OR (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 0 days.

(21) Appl. No.: 15/672,026

(22) Filed: Aug. 8, 2017

(65) Prior Publication Data

US 2017/0370745 A1    Dec. 28, 2017

Related U.S. Application Data

(63) Continuation of application No. 14/717,979, filed on May 20, 2015, now Pat. No. 9,816,830.

(51) Int. Cl.
*G01C 21/36* (2006.01)
(52) U.S. Cl.
CPC ......... *G01C 21/3658* (2013.01); *G01C 21/36* (2013.01); *B60W 2550/402* (2013.01)
(58) Field of Classification Search
CPC .............. G01C 21/3658; G01C 21/36; B60W 2550/402
See application file for complete search history.

(56) References Cited

U.S. PATENT DOCUMENTS

| | | | |
|---|---|---|---|
| 6,018,697 A | 1/2000 | Morimoto et al. | |
| 6,950,745 B2 | 9/2005 | Agnew et al. | |
| 6,989,765 B2 | 1/2006 | Gueziec | |
| 7,610,145 B2 | 10/2009 | Kantarjiev et al. | |
| 8,362,894 B2 | 1/2013 | Shah | |
| 9,406,229 B2* | 8/2016 | Basnayake | G08G 1/096716 |
| 2001/0013837 A1 | 8/2001 | Yamashita et al. | |
| 2008/0319640 A1 | 12/2008 | Fujita et al. | |
| 2011/0106430 A1 | 5/2011 | Schirmer et al. | |

(Continued)

FOREIGN PATENT DOCUMENTS

EP    2290324 A1    3/2011

OTHER PUBLICATIONS

PCT International Search Report and Written Opinion, PCT Application No. PCT/IB2016/051778, dated Jul. 4, 2016, 9 pages.

(Continued)

*Primary Examiner* — Thomas Ingram
(74) *Attorney, Agent, or Firm* — Fenwick & West LLP

(57) ABSTRACT

A navigation system provides lane guidance for a navigation route. The navigation route specifies actions for a user to navigate a route from an originating point to a destination along a set of road segments. The lane guidance at a position along the navigation route scores the lanes and provides the lane scoring for the user. To score the lanes, the navigation system determines a lane distance for each lane indicating how far along the navigation route a user may continue to use this lane, without shifting to another lane. The lane distance may be measured up to a look-ahead distance. The lane distance includes distance along subsequent road segments of the route, such that when a lane turns onto a lane on another road segment according to the navigation route, the distance along the other road may be included in the lane distance.

20 Claims, 4 Drawing Sheets

(56) References Cited

U.S. PATENT DOCUMENTS

| | | | |
|---|---|---|---|
| 2011/0184641 A1* | 7/2011 | Arie | G01C 21/3658 |
| | | | 701/533 |
| 2012/0150437 A1* | 6/2012 | Zeng | B60W 30/12 |
| | | | 701/456 |
| 2014/0278052 A1* | 9/2014 | Slavin | G01C 21/3492 |
| | | | 701/400 |

OTHER PUBLICATIONS

United States Office Action, U.S. Appl. No. 14/717,979, filed Apr. 10, 2017, 8 pages.
United States Office Action, U.S. Appl. No. 14/717,979, filed Sep. 12, 2016, 7 pages.

\* cited by examiner

NAVIGATION LANE GUIDANCE

CROSS REFERENCE TO RELATED APPLICATION

This application is a continuation of co-pending U.S. application Ser. No. 14/717,979, filed May 20, 2015, which is incorporated by reference in its entirety.

BACKGROUND

The described embodiments relate generally to providing driving guidance, and particularly to providing lane guidance to improve lane selection while navigating a route.

Navigation services provide directions for a user to follow to reach a destination. The directions are provided as a navigation route, instructing a user which roads to use to arrive at the destination. Current navigation services typically provide navigation services on a turn-by-turn basis. That is, the navigation system specifies a turn from one road to another. However, users are often faced with roads that include several lanes of traffic, without knowing which lanes are best before the turn, or during the turn which turning lane is preferable. Since lanes may merge with other lanes, split into multiple lanes, be ineligible to perform a desired turn, and so forth, users may spend considerable time navigating lanes on a road to identify preferred lanes for an unfamiliar route.

SUMMARY

A navigation system provides lane guidance along a navigation route. The navigation system provides turn-by-turn directions along a navigation route (e.g., a set of roads or road segments) from a start position (or a current position) to a destination, for example, by indicating which roads will provide an efficient route. Each road or road segment includes one or more lanes, particular ones of which enable a driver to take individual actions designated by the navigation route, such as turning right, turning left, staying right at a lane split, etc. The navigation route may also identify lane relationships that occur as a consequence of the manner in which road segments connect. For example, performing an action of turning right on a lane second from the right on a first road segment in a route may place the user in a middle lane of the next road segment.

The navigation system determines lane scoring information for lanes along the navigation route. To score the lanes, the navigation system determines a lane distance that the lane continues along the navigation route. Certain lanes may be eligible to perform the next action for continuing along the route, while other lanes proceed in other directions that do not continue along the route. To determine a score for a lane, the navigation system determines how long a driver may continue along the lane while following actions on that lane that continue on along the route. For example, a navigation route may specify that a user should continue along a road for the next 5,000 feet from a specified position. At that specified position, there are two lanes, one which is required to turn right in 500 feet, while the other continues along the route for more than 5,000 feet. These lanes are scored by determining how far the user may continue along the lanes, in this example, the lane which is required to turn right in 500 feet scores lower than the lane that continues along the navigation route.

As noted, to measure and score each lane, the navigation system determines a lane distance identifying how far the lane continues along the route. In the previous example, the lane distance for the lane that is forced to turn right is 500 feet, as that lane no longer continues along the route after it is forced to turn. The lane distance for the lane may be measured to a maximum look-ahead value, which can be based, for example, on a distance or driving time ahead of the current position for lane guidance. When determining the lane distance for a lane, the navigation system follows the lane through turns and other actions in the navigation route to include in the lane distance any subsequent road segment and lane on the subsequent road accessed by the evaluated road. The lane on the subsequent road may be similarly evaluated to determine further distance along that lane and additional actions along the navigation route that continue in that lane. Each lane is scored using the associated lane distance, with increasing scores when the lane distance is higher, indicating that a user may stay in that lane for a longer amount of time without requiring further lane changes. The scoring may also be affected by expected traffic, merges or splits of the road, and other features. Using the scoring, the scored lanes may be sent to a user, using video or audio instructions to indicate the preferred lane for the user's position.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
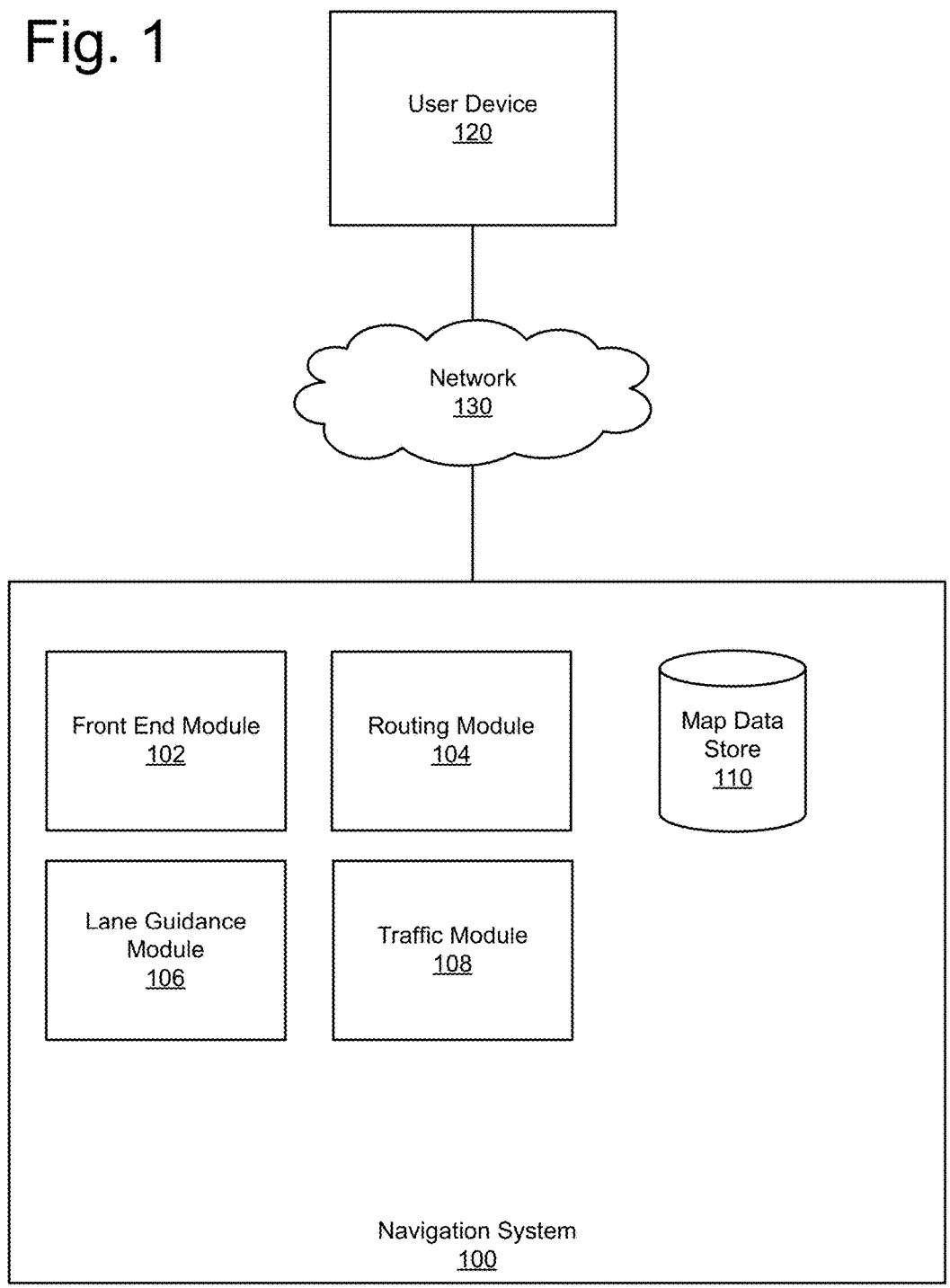
FIG. 1 illustrates an environment for a navigation system 100 according to one embodiment.

FIG. 1 illustrates an environment for a navigation system 100 according to one embodiment. The navigation system 100 receives requests for a navigation route from a user device 120 via a network 130 and provides the requested navigation route and related lane guidance to the user device 120. The navigation route describes a list of road segments for a vehicle to navigate from a start position to a destination, which includes a set of actions for the user to perform while navigating the roads, such as turning left, turning right, or continuing straight. The navigation system 100 provides lane guidance to the user device 120 to indicate particular lanes that are preferable at various points in the navigation route. This lane guidance may indicate, for example, an ordered or score preference for lanes at a particular part of the navigation route.

The user device 120 (or other system providing requests to the navigation system 100) provides a navigation request to the navigation system 100. The user device 120 is any suitable computing system, such as an in-vehicle navigation system or car dashboard. The user device may also be a laptop, a handheld computing device (such as a mobile phone or tablet computer), and the like that provide computing and location information to the navigation system 100 as described herein. The user device 120 may also be any additional electronic used for travel.

According to some examples, a user can operate the user device 120 to make a request for navigation to the navigation system 100. The request for navigation may designate, for example, a destination for the navigation, or a search string for the navigation system 100 to identify the destination by searching a database for a destination using the search string. For example, the user can provide input, via an input mechanism, such as a touch-sensitive display of the user device 120, to specify an address or a point of interest as the destination the user wishes to travel to. The user device 120 in some embodiments includes a positioning system, such as a global positioning system (GPS) receiver, or other means of determining the position of the user device 120, such as by triangulation to local wireless receivers. The location of the user device 120 may be included with the request. The user device 120 receives a navigation route from the navigation system 100 and provides instructions from the navigation route to the user, including, in one example, step-by-step guidance as the navigation route is followed (e.g., by presenting content to a display of the user device 120 and/or outputting audio using a set of speakers). When the navigation route includes lane guidance information, the user device 120 can also display the route guidance information on the display of the user device 120 and/or output audio corresponding to the lane guidance information (e.g., by voice). The user device 120 may receive lane guidance as part of the received navigation route or routing information, or the user device 120 may request lane guidance from the navigation system 100 as the route is navigated.

The network 130 provides a pathway for communication between the user device 120 and the navigation system 100. The network 130 is any suitable type of network for this communication, which may be wired or wireless, and may pass through intermediary switches and nodes between the user device 120 and navigation system 100. Each of the navigation system 100 and the user device 120 can include communication sub-systems, such as wireless transceivers, to exchange data over the network 130.

The navigation system 100 includes various modules and data stores for performing route navigation and lane guidance. As described herein, a module or a component can include or correspond to a program, a sub-routine, a portion of a program, or a software component or hardware component capable of performing one or more stated tasks or functions. A module or a component can exist on a hardware component independently of other modules or components, or alternatively, can be a shared element or process of other modules, programs, or machines. In the example of FIG. 1, the navigation system 100 can include a front end module 102, a routing module 104, a lane guidance module 106, and a traffic module 108. The navigation system 100 also includes a map data store 110. In some examples, various features described herein as relating to the navigation system 100 may be implemented by the user device 120. For example, in one implementation, the routing and/or lane guidance modules can be implemented by the user device 120, while in another implementation, the navigation system 100 can be wholly implemented by the user device 120 rather than comprising a separate system.

The map data store 110 includes map data used for generating navigation routes. The map data includes roads, addresses, intersections, destination information (e.g., points of interest and business information), and other data for generating navigation information of roads. The map data can also specify the number of lanes for a road at various parts of the road, permitted actions from particular lanes (such as whether a lane must turn right, may turn right or go straight, or must go straight), maximum speed of a road, average speed of drivers on a road, and so forth. Still further, in one example, the map data may be stored as a plurality of layers, e.g., individual layers for highway roads, for major streets, and for minor streets, while in another example, the map data may be stored as a graph, with road segments representing connections between nodes in the graph. The nodes may represent intersections or other transitions between roads in the graph.

The front end module 102 receives requests for navigation from the user device 120. The front end module 102 also transmits the navigated routes and lane guidance to the user device 120. The front end module 102 communicates with the user device 120 according to the protocols used by the user device 120 to access the navigation system 100. For example, the front end module 102 may provide the navigation route using a protocol specialized for the user device 120, and may not be responsible for generating an interface for display to the user. In alternative embodiments, the front end module 102 can provide an interface (e.g., a web page) for display to the user device 120, can provide an application programming interface (API) to a program operated on the user device 120, or can communicate with a proprietary application associated with the navigation system 100 that is stored on the user device 120, among other configuration options. After receiving the navigation request, the front end module 102 transfers the navigation request to routing module 104.

The routing module 104 generates a navigation route from a start position to a destination. The routing module 104 accesses the map data store 110 to identify possible routes and road segments that a vehicle can travel on to get from the start position to the destination. The routing module 104 scores the possible routes and identifies a preferred route to reach the destination. The routing module 104 may generate a navigation route that minimizes Euclidean distance traveled or other cost function during the route, and may further access the traffic module 108 to receive traffic estimates that affect an amount of time it will take to travel on a particular route. Depending on implementation, the routing module 104 can generate one or more routes using various routing methods, such as Dijkstra's algorithm, Bellman-Ford algorithm, or other algorithms. The routing module 104 may also use the traffic information to generate a navigation route that reflects expected conditions of the route (e.g., current day of the week or current time of day, etc.), such that a route generated for travel during rush-hour may differ from a route generated for travel late at night. The routing module 104 may also generate more than one navigation route to a destination and send more than one of these navigation routes to the user device 120 for selection by the user from among various possible routes.

The traffic module 108 accesses and provides traffic data relating to roads and, where available, for individual lanes of traffic on a road. The traffic information may be based on data received from various sources, such as third-party providers, or by analyzing the speed of users navigating routes planned by the navigation system. For example, the traffic module 108 can receive, over the network 130, a plurality of GPS location points from individual user devices 120 of a plurality of user devices 120. The traffic module 108 can determine traffic information along a particular road segment based on the GPS location points and their corresponding timestamps. The traffic information may reflect real-time data, and may include accidents and construction or road work that impacts traffic on a road, or may impact individual lanes of traffic. For example, an accident on the right-most lane of a highway may impact the right-most lanes of the highway more severely than the left-most lane of the freeway. The real-time data may be derived from a variety of sources, such as reports of road conditions from public or private sources, or crowd-sourced information from individual users navigating traffic. The traffic module 108 may also include historic information relating to the traffic on a road or lane as it varies with respect to particular repeatable periods of time, such as within a day or within a week. In addition, particular days of the year may be identified for purposes of traffic data, such as the days around particular holidays or other events that impact traffic, such as sporting events.

The routing module 104 can also determine lane-by-lane traffic scoring based on inferences or rules of traffic related to a lane. For example, for a road segment that is typically not impacted by traffic, a lane that may continue along the road or turn onto another road may be impacted by traffic on the other road. If traffic is expected along the other road, that traffic may impact traffic in that lane, even for routes that continue along the first road. Similarly, a lane that has an upcoming merge with another lane, as is often the case with highway on-ramps, may score poorly relative to lanes that do not have to accommodate merging traffic. These features of a lane may impact the traffic score of the lane.

The lane guidance module 106 determines lane guidance information for lanes of a given position along a road of a navigation route. The lane guidance module 106 can determine lane information (e.g., the number of lanes, which lanes go straight or turn at what location data points, etc.) for road segments of a navigation route from map data stored in the map data store 110. The lane guidance information describes preferred lanes of the route, and may indicate lane guidance in several ways. In one example, the lane guidance information includes a score for each lane of a road segment of the route, which can correspond to a relative score that is relative to other lanes of the road segment (if more than one lane exists on the road segment) or correspond to an absolute score for each lane. In one embodiment, scores for the lanes are scaled relative to the highest-scoring lane and may indicate a percentile of the lane's score compared to the highest-scoring lane. As further described below, the scores for individual lanes may be generated based on a distance or time that a lane continues along the navigation route, which may be modified based on other factors reflecting desirability of a lane, such as expected traffic in the lane. The lane guidance information can be stored in the map data store 110 or another database accessible by the navigation system 100.

The starting position in the navigation route for which the lane information is generated is typically a location of the user (i.e., as provided by the user device 120), as the user navigates the route. However, the lane information may also be generated for positions along the entire navigation route. For example, the lane guidance module 106 may evaluate lane information at certain intervals, such as every 100 meters, of the navigation route. In one embodiment, rather than measuring intervals by distance, the lane information is evaluated at specified time intervals, such as the expected distance traveled on the navigation route each five minutes. In another embodiment, to optimize space and provide continuous lane guidance without regard to specific distances or time, lane information is generated by the lane guidance module 106 at each point that the number of lanes or the connections to future or proceeding lanes change. In this embodiment, between these evaluated points, the change in score may be interpolated when user module 120 displays such lane information.

To generate the lane guidance information, the lane guidance module 106 identifies the lanes of the road segment at the position being evaluated. For each lane, the lane guidance module 106 determines the length ahead of the position that the lane remains part of the navigation route, termed a lane distance. The lane guidance module 106 may determine the length ahead of the position up to a look-ahead distance (e.g., in other words, determine the lane distance for a particular lane from the position being evaluated to the look-ahead distance, such as one mile). The look-ahead distance may be a static value or may vary. The look-ahead distance may vary as specified by a user of the user device 120, or may vary based on a travel speed at the position or based on a type of road at the position or a travel time. For example, the look-ahead distance for a highway may be greater than a look-ahead distance on a city street, and a look-ahead distance for a vehicle traveling quickly on the highway may be greater than a vehicle traveling slowly on the highway. The look-ahead distance may be determined by the lane guidance module 106, or may be determined by the user device 120. In one embodiment, the user device 120 may set the look-ahead distance to any value below that generated by lane guidance module 106 as may be convenient for or selected by the user.

As the lane guidance module 106 evaluates a lane, the actions along the navigation route are checked using map data to determine whether an action (e.g., to turn right or left) is required, and whether the action is valid for that lane. When the lane does not permit the required action, the lane distance of the lane ends, which may be prior to the look-ahead distance. For example, when the action requires a user to turn right and the evaluated lane is required to turn left, the lane distance for the lane is terminated at that point. When the lane is valid for the required action, the lane guidance module 106 identifies which lane on the subsequent road segment receives a vehicle taking the action from the lane. In this way, the lane on the subsequent road segment is "followed" to determine the lane distance for the evaluated lane. Thus, the lane distance may represent distance along the lane that a user may continue while incorporating lanes in subsequent roads after executing actions for the navigation route. The look-ahead distance may include more than one action in determining the look-ahead for a lane.

In an alternate embodiment, rather than a "look-ahead" from a given position, the lane guidance module 106 may determine the lane distance based on a "look-back" from further points along the route, such that the lane guidance module 106 evaluates lane guidance beginning from the destination in the route, and follows the route towards the beginning of the route in generating lane guidance. By following the route guidance from the destination to the beginning, the lane guidance module 106 may count at each position in the navigation route how far each lane was a part of the route already assessed by the lane guidance module 106. In one embodiment, rather than evaluate each position, the lane guidance module 106 evaluates points at which the lanes available on the route change (e.g., merge, split, or are part of a turn).

After determining a lane distance for a lane, additional scoring features may also be determined for the lane. The scoring features may include various aspects of a lane that suggest the lane will be a better lane for the navigation route.

One scoring feature includes expected traffic for the lane. The lane guidance module 106 accesses the traffic module 108 to determine expected traffic for the lane, which may be impacted by the time of day of the route or current lane conditions as described above with respect to the traffic module 108. Another scoring feature includes whether the lane includes a merge or a split later on in the route. For example, a merge designates that another lane is combined with the current lane, while a split indicates that an additional lane is created from the lane. When a merge occurs, traffic is likely to be increased while vehicles from the different lanes merge together, and likewise when a split occurs, vehicles in the current lane are likely able to accelerate, as the traffic in one lane may now be split among two. Thus, the scoring for a merge reduces the desirability of a lane and scoring for a split increases the desirability of a lane. Additionally, lanes may be scored by the type of traffic permitted for a vehicle. For example, a vehicle identified as a High Occupancy Vehicle (HOV) may indicate a preference for any HOV-specific lanes, while a non-HOV vehicles would be expected not occupy such a lane. In another example, a designated truck lane may be expected to move at a slower speed and may further have a lower speed limit for traffic in the designated truck lane. Accordingly, non-truck vehicles may receive a penalty to the score function for that lane. Further, local motor vehicle code may indicate when being in a left lane (in a right-hand drive country) is inappropriate except to pass, in which case the score may indicate that the right-most lane of good lanes is best for avoiding merge traffic while not impeding the smooth flow of passing vehicles.

Such score interpretation may be configurable by the user to include or exclude various scoring features. For example, different types of drivers may want a particular scoring feature more than other types of drivers. In another example, the lane scoring module 106 may modify the lane scores to suggest (i.e., score higher) further left (passing) lanes when real-time traffic indicates that the current more right (non-passing) lane is slower that the typical traffic-free speed of vehicles on the road. The further right (non-passing lanes) may also be suggested when further left lanes are shown by real-time traffic to be slower than typical traffic-free speed of vehicles, to discourage prolonged driving in the passing lane. This scoring may only be used within a certain speed range, such as within 0-5 miles of a speed limit for the road.

In a situation where lane scores are relatively equal for a certain amount of time or distance ahead, the scoring algorithm may attempt to distribute lane load across relatively similar lanes to increase overall road throughput by using as much lane capacity as possible. Such distribution scoring may use the current real-time speed of the current lane to inform the server's traffic module, helping inform other vehicles around them of the best traffic lane or lanes to be in. Scores may be modified both by the lane guidance module and by the user device 120, depending on which module is closest to the data necessary to make the most efficient score adjustments.

Using the lane distance and any applicable scoring features, at a road segment for a given current position of the user device 120, the lane guidance module 106 generates a score for each of the one or more lanes at that road segment. The scores for each lane may be scaled based on the score for the highest-scoring lane. These scores may be converted to a percentile. For example, a first lane may score 15, a second lane 60, a third lane 75, and a fourth lane 0 as a raw score (e.g., from left to right). The lane guidance module 106 identifies the third lane as the maximum-scoring lane, and adjusts the raw scores as a percentile of the maximum-scoring lane. This score provides that the first lane is 20% of the maximum, the second lane 80%, the third lane 100%, and the fourth lane 0% of the maximum score. The percentage-based lane score may also be rounded to a nearest percentile, such as the nearest $25^{th}$ or $10^{th}$ percentile.

The lane guidance module 106 may also generate lane guidance information for lanes after the next action along the navigation route. Thus, the lane guidance information may indicate scores for lanes after a user turns left or right, for example, and then again may indicate scores for lanes after the user perform the subsequent action, and so forth. This additional guidance may be termed "compound" lane guidance, as it provides lane guidance for a given position as well as a subsequent position of along the route. The compound lane guidance information may be generated when the evaluated position is within a threshold distance or time of the action. To perform this lane guidance operation, the lane guidance module 106 identifies a subsequent action from the position and generates lane guidance information for a second position on the next road after the subsequent action. Thus, if a user is two miles from a turn to the right onto another road (and within the compound guidance threshold), the lane guidance module 106 may generate lane guidance information for the current position as well as lane guidance information for the lanes on the other road after the right turn. This permits a user to identify, before the turn, which lanes are preferable on the new road, even when there may not be an immediate turn or other action on the new road.

Figure 2:
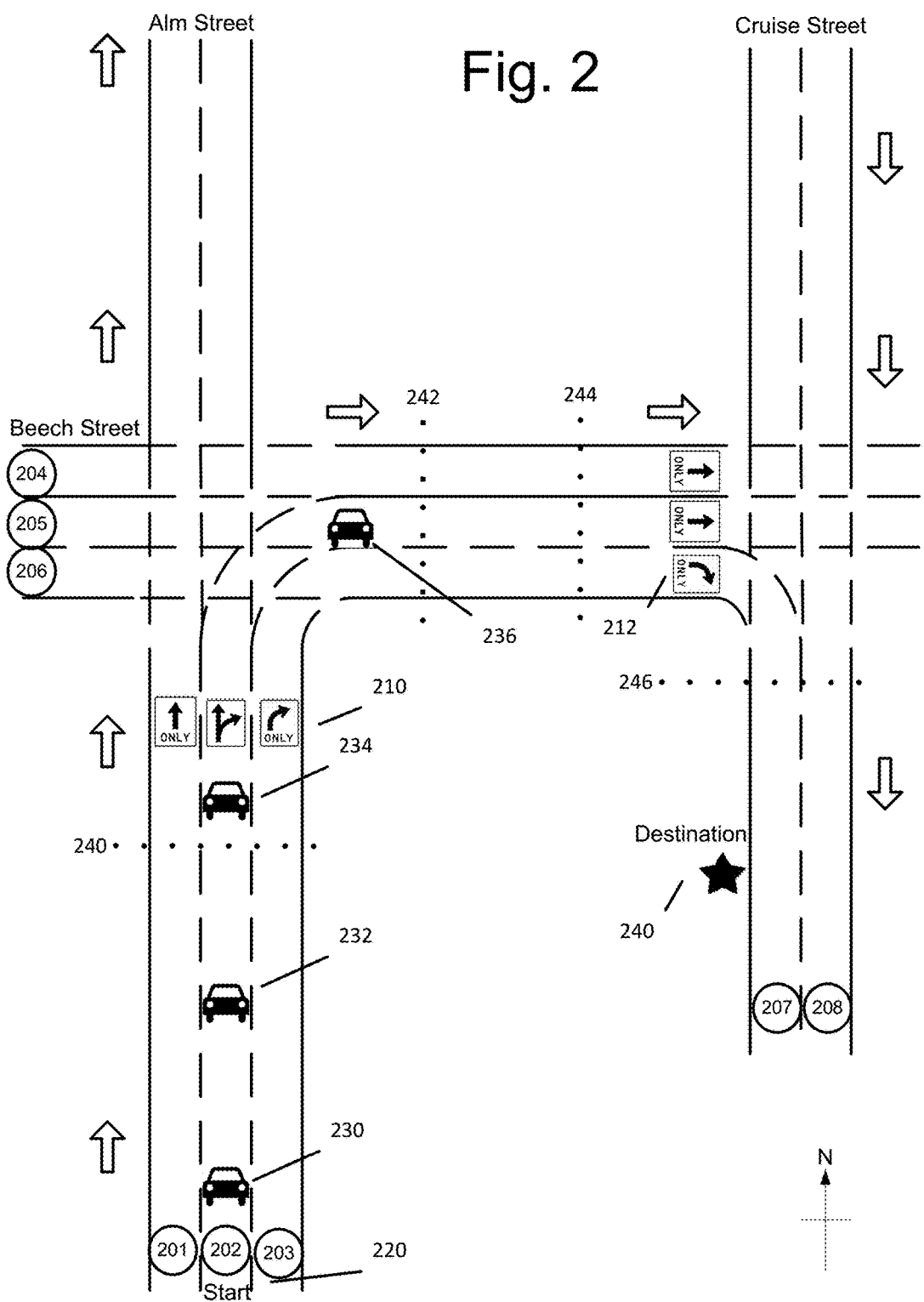
FIG. 2 illustrates an example of a navigation route.

FIG. 2 illustrates an example of a navigation route. In this example, each road, Alm Street, Beech Street, and Cruise Street, is a one-way street for convenience of illustration. The navigation route, in this example, begins on Alm Street at start 220 and ends at destination 240. In one example, the start 220 can correspond to the position of the user device 120 at the time the navigation route was determined. The navigation route directs the user to continue North along Alm Street, turn right on Beech Street, and turn right again on Cruise Street. Thus, in this example, the actions for the navigation route include a right turn on Beech Street and a right turn on Cruise Street.

As shown in FIG. 2, Alm Street includes lanes 201, 202, and 203, Beech Street includes lanes 204, 205, and 206, and Cruise Street includes lanes 207 and 208. A vehicle on each lane is permitted to perform certain actions at each intersection between streets as designated by permitted actions 210 and 212. These actions may be specified by signs on the road, and may be represented in the navigation system 100 as actions permitted at specific lanes. These actions may be defined by map data, and in some circumstances, some actions may be excluded by rules. For example, since Beech Street is a one-way street, no lanes 201-203 may turn onto Beech Street in a way contrary to the one-way street (e.g., vehicles cannot turn left onto Beech Street from Alm Street). In this example, on Alm Street at the intersection of Beech Street, lane 201 is required to continue on Alm Street, lane 203 is required to turn right onto Beech Street, and lane 202 may continue along Alm Street or turn on Beech Street. On Beech Street at the intersection with Cruise Street, lane 206 is required to turn right onto Cruise Street, while lanes 204 and 205 continue along Beech Street.

In this example, the lane guidance module 106 evaluates lane guidance information at multiple instances, such as at positions 230, 232, and 234, representing distances far from an intersection (230), nearer to an intersection (232), and close to an intersection (234). These positions are selected for illustration only to illustrate the lane distance generated for various lanes and may represent lane guidance information generated for a user as the user travels through each of the positions 230, 232, and 234 as determined by location information. As noted above, lane guidance information may be generated for various points along the navigation route, and scoring for each lane may be further modified based on various features of the lanes.

At position 230 on the navigation route, there are three lanes 201-203 on Alm Street. In this example, the look-ahead distance 240 (e.g., three hundred meters) for each lane from position 230 does not reach the intersection of Alm Street and Beech Street. Thus, in scoring each lane at position 230, the lane guidance module 106 may compute the same score for each lane unless other factors affect the scoring for individual lanes (e.g., traffic predictions). These road segments prior to a change in factors (i.e., change in lane conditions) along the route may also be associated with an offset score to add to each lane to adjust the score to that particular point based on the computed scores related to a point at which the factors change. For example, an offset score may be stored at the point of the intersection of Alm Street and Beech Street. The user device 120 may interpolate offset scores between two provided points with offset scores (or a zero offset if there is no offset score, but instead a real full score set, at that point).

At position 232 on the navigation route, the look-ahead distance 242 for each lane reaches (and goes past) the intersection of Alm Street and Beech Street, in this example. At Beech Street, lane 201 does not continue along the navigation route, while lanes 202 and 203 may turn right to continue on the navigation route. Thus, the lane distance for lane 201 is limited to the distance to the intersection, while the lane distance for lanes 202 and 203 may include a portion of Beech Street until the look-ahead distance is reached. That is, the lane distance for lane 202 is evaluated by determining that lane 202 continues through an action on the navigation route onto lane 205 of Beech Street. The distance along lane 202 from position 232 to the intersection (e.g., the middle of the intersection) and the distance along lane 205 from the intersection to the position corresponding to the end of the look-ahead distance 242 are combined to determine the lane distance for lane 202 (e.g., based on distance information of road segments from the map data). Similarly, the respective portion of the lane 203 may be combined with the respective portion of the lane 206. Thus, the lane distance (to be used for scoring) is greater for each of lanes 202 and 203 than lane 201, thereby permitting the lane guidance module 106 to generate scores for position 232 that indicate lanes 202 and 203 are better lanes for the user to travel on than lane 201, even though the position 232 may not necessarily be close enough for turn-specific guidance (e.g., even though the user, at position 232, may not have received an instruction to turn right). As an example, the lane scoring for lanes 202 and 203 may indicate 100%, while lane 201 scores 80%. This indicates that, at position 232, lanes 202 and 203 will continue along the navigation route for a greater distance than lane 201. In other words, while lane 201 continues along the route for some amount of time, lane 201 does not continue as far along the route relative to lanes 202 and 203.

At position 234 on the navigation route, the look-ahead distance 244 for each lane reaches (and goes past) the intersection of Alm Street and Beech Street, and like the example for position 232, the lane distance for each of lanes 202 and 203 continue along the navigation route. Position 234 in this example has an action to turn right on Beech Street within a compound lane guidance threshold (e.g., two hundred meters, five hundred meters, etc.). To provide the compound lane guidance for position 234, the lane guidance information is generated for position 236, which corresponds to a position after the action on the navigation route. In this example, when evaluating the lane distances for position 236, the look-ahead distance 246 may include the intersection of Beech Street and Cruise Street. According to the navigation route for the user, when the user is traveling on Beech Street and approaches the intersection of Cruise Street, the user is to take an action to turn right onto Cruise Street. At the time or location where this action is to be performed at Beech Street and Cruise Street, lanes 204 and 205 do not continue along the route, while lane 206 continues along the route by turning onto lane 207 of Cruise Street. Thus, the lane distance from position 236 for each of lanes 204 and 205 may be shorter than the lane distance of lane 206, which includes the action of turning right onto lane 207. Thus, for example, the lane distance for lane 204 may be 800 feet, the lane distance for lane 205 may be 800 feet, and the lane distance for lane 206 may be 1,000 feet as measured from position 236. By including this compound guidance information, at position 234, a user may determine that while both lanes 202, 203 are good lanes to turn from Alm to Beech, after the turn, lane 206 may be preferable. In this manner, the user can be notified in advance, which lane to be positioned in even before multiple actions are to be performed in connection with the navigation route.

In this example, the look-ahead distance for position 236 included the action at the intersection of Beech Street and Cruise Street. If the look-ahead distance for position 236 did not reach that intersection, then the lane guidance for position 236 may indicate that each of the lanes 204-206 continues to the look-ahead distance. In such an example in which the look-ahead distance is 750 feet, the lane scoring for lane 204 may indicate a lane distance of 750 feet, the lane scoring for lane 205 may indicate a lane distance of 750 feet, and the lane scoring for lane 206 may indicate a lane distance of 750 feet. Accordingly, each of the lanes 204-206 may score equally well as the look-ahead distance does not include the intersection at which the lanes do not all continue along the route. As noted, however, the lanes may ultimately score differently based on traffic or other lane-specific features incorporated into the scoring in addition to the lane distance.

Figure 3:
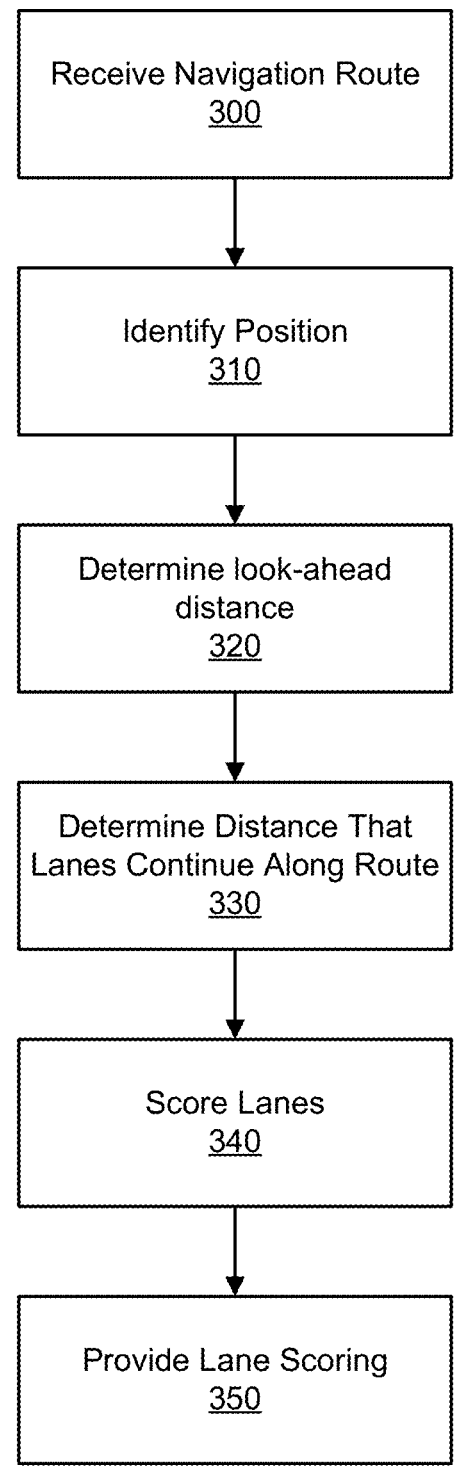
FIG. 3 illustrates an example method for providing lane guidance in connection with a navigation route according to one embodiment.

FIG. 3 illustrates an example method for providing lane guidance in connection with a navigation route according to one embodiment. According to one implementation, the method may be performed, for example, by the lane guidance module 106. The lane guidance module 106 receives or determines 300 a navigation route for which to generate lane guidance. For example, the navigation route can be determined by the routing module 104 in response to receiving a request for navigation from a user operating a user device 120. The navigation route can be based on the current position of the user device 120 at the time the request for navigation is received and a specified destination location.

A position on the route is identified 310 for determining the lane guidance, which may be a position of the user device 120 along the navigation route, or another specified position of the navigation route (e.g., a position that the user will travel to from the current location, or a position that is a predetermined distance away from the current location along the navigation route). A look-ahead distance is determined 320 for the identified position. Depending on implementation, the look-ahead distance can be a predefined distance or a dynamic distance that can change based on current conditions, such as based on the user's speed of travel (e.g., based on location data points received from the user device 120) and/or other vehicles at the identified position. Next, for each lane of a road segment that the identified position is located at, the lane guidance module 106 determines 330 the lane distance that the lane continues along the route up to the look-ahead distance, which may include the distance that the lane continues on a subsequent road after an action, as described above. Using the lane distance for each lane, the lanes are scored 340, which may include additional features in the scoring, such as expected traffic and other features noted above. The lane guidance information (e.g., the lane scoring or content corresponding to the lane scoring) is provided 350 to the user device 120 for display to the user.

For example, the user device 120 can run an application (e.g., a navigation application or a map application) to initially make the request for navigation and to receive navigation information from the navigation system 100. The navigation system 100 can provide lane guidance information along with or as part of the navigation information to the user device 120 such that the application can display content (e.g., text, graphics) corresponding to the lane guidance information on the display of the user device 120 and/or output audio corresponding to the lane guidance information (e.g., "The far right lane is the best lane to drive on") using the speakers of the user device 120.

Figure 4:
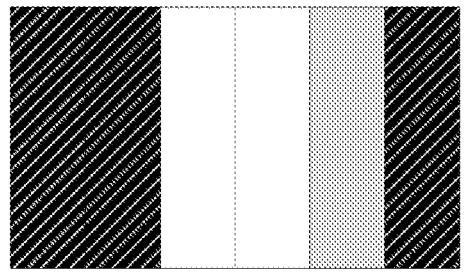
FIG. 4 illustrates an example interface for providing lane guidance to a user.

FIG. 4 illustrates an example interface for providing lane guidance to a user. In this example, six lanes are displayed to the user. The lanes may be color-coded or shaded to indicate the scoring of lanes. In this example, darker-colored lanes are lower-scoring than lighter-colored lanes. Lanes 1, 2, and 6 are low-scoring lanes (from left to right), while lanes 3 and 4 are high-scoring lanes. Lane 5, however, scores below lanes 3 and 4 and is displayed in a darker tone than those lanes, but is still a valid lane for the navigation route. In one example, the tones are provided on a scale representative of the lane's score relative to the highest-scoring lane. For example, the lanes may be displayed as a gradient from one color to another color (e.g., black to white) based on the percentage of the lane's score compared to the highest-scoring lane.

Figures 5A, 5B:
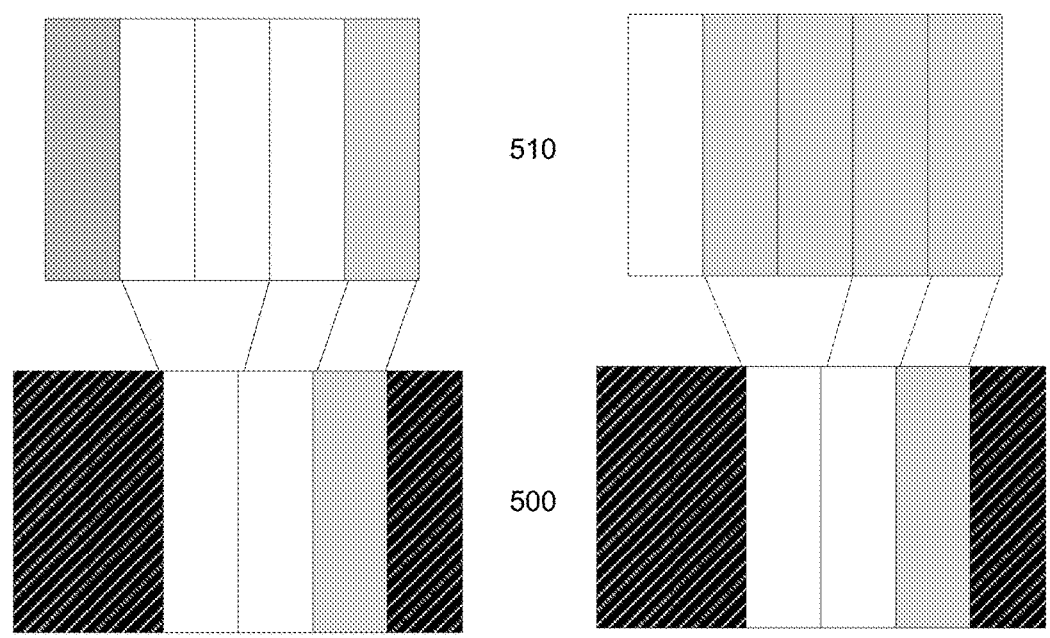
FIGS. 5A and 5B illustrate example interfaces for providing compound lane guidance according to one embodiment.

FIGS. 5A and 5B illustrate display of compound lane guidance according to one example. In these examples, a first road segment 500 has six lanes, and a subsequent road segment 510 has five lanes (as described herein, the user will travel along the first road segment before the subsequent road segment, as provided in the navigation route). The first road segment 500 has three lanes that continue on to the subsequent road segment, and in this example, the third lane splits into two lanes on the subsequent road segment 510. The lane scoring for the first road segment 500 indicates that the third and fourth lanes are most desirable, while the fifth lane is also a preferred lane as compared to the first, second, and sixth lanes. The lane guidance for the subsequent road segment differs between the examples of FIGS. 5A and 5B for purpose of illustration. In FIG. 5A, the second, third, and fourth lanes in the subsequent road segment 510 are preferred lanes, while in FIG. 5B, the first lane scores highest (and is the best preferred lane). Thus, in FIG. 5B, a user may use the guidance for road segment 500 to determine a lane for continuing on to road segment 510, while knowing that on road segment 510, the first lane is scores highest after the change to the subsequent road 510. Accordingly, in the example of FIG. 5B, the user may choose to travel along the third lane on the road segment 500 so that he or she may then most easily change lanes from to the first lane of the road segment 510. In the last example, an audio prompt may be provided either before (if the subsequent maneuver after the next maneuver is just a short distance after the next maneuver) or after the next maneuver, warning the driver that a lane change to the left is likely necessary.

By using the colored lane guidance as shown in FIGS. 4, 5A, and 5B, as a user travels along a navigation route, the lanes may gradually darken as the user approaches the end of the lane. For example, referring back the route illustrated in FIG. 2, as the user travels from position 230 to position 234, where initially each of the lanes may have scored highly, as the user approaches the action to turn right, the lanes that score lower over time are visually presented to the user as increasingly darker lanes, permitting a user to know that the lane will no longer be a good lane over time, and permitting a user to merge at the user's convenience, rather than receiving lane guidance only at the point of an action (e.g., the intersection at which the user must turn).

While the examples of FIGS. 4, 5A, and 5B illustrate the lane guidance being shown in colors or tones, other indicators can be used to provide the lane guidance information to the user. For example, in one example, rather than using colors or tones, graphical or visual features can be shown for different lanes, while in another example, textual content can be displayed corresponding to the most preferred lane for the user to travel in (e.g., "travel on either the second lane or third lane from the right"). Still further, in another example, the lane guidance module 106 can also select the best lane for the user (e.g., make a decision for the user) based on the highest lane scoring as opposed to providing multiple preferred lane information.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    determining a navigation route including a plurality of road segments and a set of actions for transitioning to a subsequent road segment from a prior road segment of the plurality of road segments;
    determining a position of a user device on a current road segment of the plurality of road segments based on signals from a location positioning sensor on the user device;
    for each of a plurality of lanes of the current road segment, determining a score for the lane based at least in part on an estimated level of traffic for the lane along a distance of the navigation route, the distance including additional distance from the position to be traveled on one or more road segments subsequent to the current road segment as indicated by the set of actions;
    selecting a lane of the plurality of lanes based on the scores; and
    providing information to the user device for modifying a display of the user device to indicate the selected lane.

2. The method of claim 1, wherein determining the score comprises:
    responsive to determining that the lane merges with another lane along the additional distance, increasing the estimated level of traffic for the lane.

3. The method of claim 1, wherein determining the score comprises:
    responsive to determining that the lane splits into at least one other lane along the additional distance, decreasing the estimated level of traffic for the lane.

4. The method of claim 1, wherein determining the score comprises:
    determining a type of vehicle associated with the user device; and
    determining a lane type of the lane along the one or more road segments, wherein the score is further determined based on whether the type of vehicle corresponds to the lane type.

5. The method of claim 4, wherein the type of vehicle is a high occupancy vehicle (HOV) or a truck, and wherein the lane type is a HOV lane or a designated truck lane.

6. The method of claim 1, further comprising:
    determining a current lane of the user device on the current road segment based on the signals from the location positioning sensor; and
    responsive to determining that the selected lane does not match the current lane, providing the information for modifying the display of the user device to indicate an action for switching from the current lane to the selected lane.

7. The method of claim 1, wherein the score is further determined based on a free speed of vehicles traveling along a different one of the lanes.

8. The method of claim 1, wherein selecting the lane of the plurality of lanes based on the scores comprises:
    determining that a difference between scores for two or more lanes of the plurality of lanes is within a threshold value; and
    responsive to determining that one of the two or more lanes was previously selected, selecting the other of the two or more lanes.

9. A computer program product comprising a non-transitory computer readable storage medium having instructions encoded thereon that, when executed by one or more processors, cause the one or more processors to:
    determine a navigation route including a plurality of road segments and a set of actions for transitioning to a subsequent road segment from a prior road segment of the plurality of road segments;
    determine a position of a user device on a current road segment of the plurality of road segments based on signals from a location positioning sensor on the user device;
    for each of a plurality of lanes of the current road segment, determine a score for the lane based at least in part on an estimated level of traffic for the lane along a distance of the navigation route, the distance including additional distance from the position to be traveled on one or more road segments subsequent to the current road segment as indicated by the set of actions;
    select a lane of the plurality of lanes based on the scores; and
    provide information to the user device for modifying a display of the user device to indicate the selected lane.

10. The non-transitory computer readable storage medium of claim 9, wherein determining the score comprises:
    responsive to determining that the lane merges with another lane along the additional distance, increasing the estimated level of traffic for the lane.

11. The non-transitory computer readable storage medium of claim 9, wherein determining the score comprises:
    responsive to determining that the lane splits into at least one other lane along the additional distance, decreasing the estimated level of traffic for the lane.

12. The non-transitory computer readable storage medium of claim 9, wherein determining the score comprises:
    determining a type of vehicle associated with the user device; and
    determining a lane type of the lane along the one or more road segments, wherein the score is further determined based on whether the type of vehicle corresponds to the lane type.

13. The non-transitory computer readable storage medium of claim 12, wherein the type of vehicle is a high occupancy vehicle (HOV) or a truck, and wherein the lane type is a HOV lane or a designated truck lane.

14. The non-transitory computer readable storage medium of claim 9, comprising further instructions encoded thereon that, when executed by the one or more processors, cause the one or more processors to:
  determine a current lane of the user device on the current road segment based on the signals from the location positioning sensor; and
  responsive to determining that the selected lane does not match the current lane, provide the information for modifying the display of the user device to indicate an action for switching from the current lane to the selected lane.

15. The non-transitory computer readable storage medium of claim 9, wherein the score is further determined based on a free speed of vehicles traveling along a different one of the lanes.

16. The non-transitory computer readable storage medium of claim 9, wherein selecting the lane of the plurality of lanes based on the scores comprises:
  determining that a difference between scores for two or more lanes of the plurality of lanes is within a threshold value; and
  responsive to determining that one of the two or more lanes was previously selected, selecting the other of the two or more lanes.

17. A system comprising:
one or more processors; and
a computer program product comprising a non-transitory computer readable storage medium having instructions encoded thereon that, when executed by the one or more processors, cause the one or more processors to:
  determine a navigation route including a plurality of road segments and a set of actions for transitioning to a subsequent road segment from a prior road segment of the plurality of road segments;
  determine a position of a user device on a current road segment of the plurality of road segments based on signals from a location positioning sensor on the user device;
  for each of a plurality of lanes of the current road segment, determine a score for the lane based at least in part on an estimated level of traffic for the lane along a distance of the navigation route, the distance including additional distance from the position to be traveled on one or more road segments subsequent to the current road segment as indicated by the set of actions;
  select a lane of the plurality of lanes based on the scores; and
  provide information to the user device for modifying a display of the user device to indicate the selected lane.

18. The system of claim 17, wherein determining the score comprises:
  responsive to determining that the lane merges with another lane along the additional distance, increasing the estimated level of traffic for the lane.

19. The system of claim 17, wherein determining the score comprises:
  responsive to determining that the lane splits into at least one other lane along the additional distance, decreasing the estimated level of traffic for the lane.

20. The system of claim 17, wherein selecting the lane of the plurality of lanes based on the scores comprises:
  determining that a difference between scores for two or more lanes of the plurality of lanes is within a threshold value; and
  responsive to determining that one of the two or more lanes was previously selected, selecting the other of the two or more lanes.

* * * * *